United States Patent
Wang et al.

(10) Patent No.: US 10,637,320 B2
(45) Date of Patent: Apr. 28, 2020

(54) STATOR ASSEMBLIES FOR THREE PHASE DYNAMOELECTRIC MACHINES AND RELATED WINDING METHODS

(71) Applicant: Emerson Electric Co., St. Louis, MO (US)

(72) Inventors: Weirong Wang, Chesterfield, MO (US); Yongyue Yin, Hiangsu (CN)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 16/130,473

(22) Filed: Sep. 13, 2018

(65) Prior Publication Data

US 2019/0013713 A1 Jan. 10, 2019

Related U.S. Application Data

(63) Continuation of application No. 14/727,526, filed on Jun. 1, 2015, now Pat. No. 10,103,596.

(51) Int. Cl.
*H02K 11/00* (2016.01)
*H02K 3/52* (2006.01)

(52) U.S. Cl.
CPC .................... *H02K 3/522* (2013.01)

(58) Field of Classification Search
CPC .......... H02K 5/225; H02K 3/28; H02K 3/522; H02K 11/33; H02K 11/0094
USPC ......................................................... 310/71
See application file for complete search history.

(56) References Cited

U.S. PATENT DOCUMENTS

| 6,717,314 B2 * | 4/2004 | Horst ................... D06F 37/304 |
| | | 310/156.01 |
| 8,736,129 B2 | 5/2014 | Wang et al. |
| 2004/0007934 A1 | 1/2004 | Michaels et al. |
| 2012/0098380 A1 | 4/2012 | Wang et al. |
| 2014/0127056 A1 * | 5/2014 | Wang ...................... H02K 3/28 |
| | | 417/410.5 |

FOREIGN PATENT DOCUMENTS

| CN | 1669202 A | 9/2005 |
| CN | 202475043 U | 10/2012 |
| CN | 103812237 A | 5/2014 |

* cited by examiner

*Primary Examiner* — Jianchun Qin
(74) *Attorney, Agent, or Firm* — Harness, Dickey & Pierce, P.L.C.

(57) ABSTRACT

According to some aspects of the present disclosure, example stator assemblies for three phase dynamoelectric machines and related winding methods are disclosed. An example stator assembly generally includes a non-segmented stator core including a stator yoke and a plurality of teeth. The stator assembly also includes a plurality of coil portions electrically coupled in a delta winding pattern, and including a first coil portion extending around a first one of the plurality of teeth and a second coil portion extending around a second one of the plurality of teeth. The stator assembly further includes a plurality of connection portions including a first connection portion extending between the first coil portion and the second coil portion and electrically coupling the first coil portion and the second coil portion. The first coil portion, the second coil portion and the first connection portion are defined by a continuous length of winding wire.

15 Claims, 8 Drawing Sheets

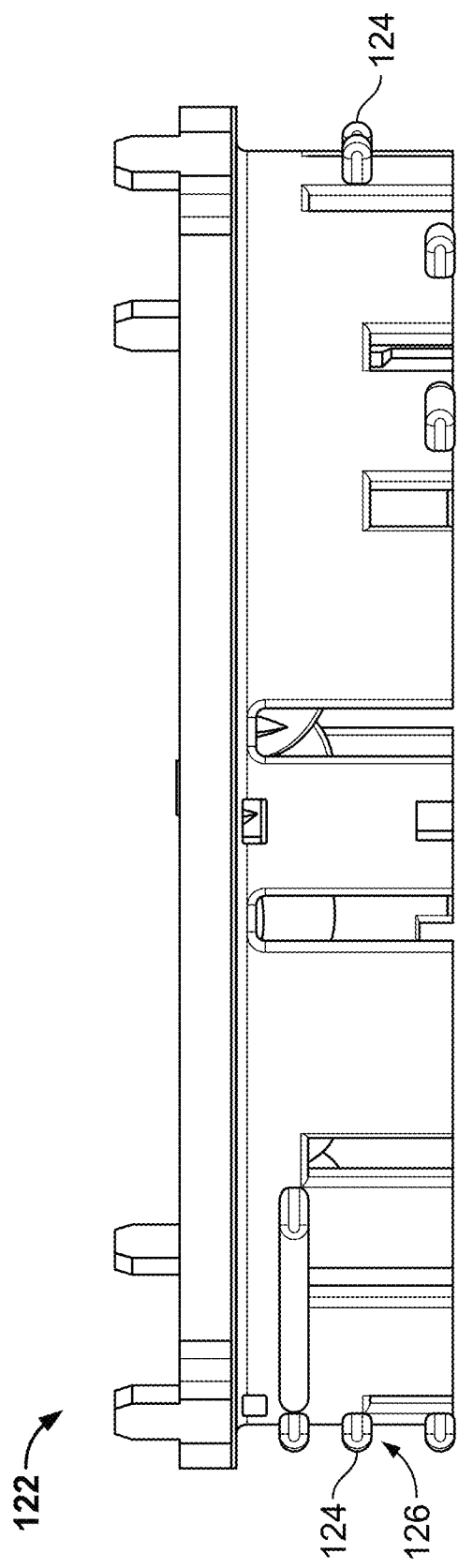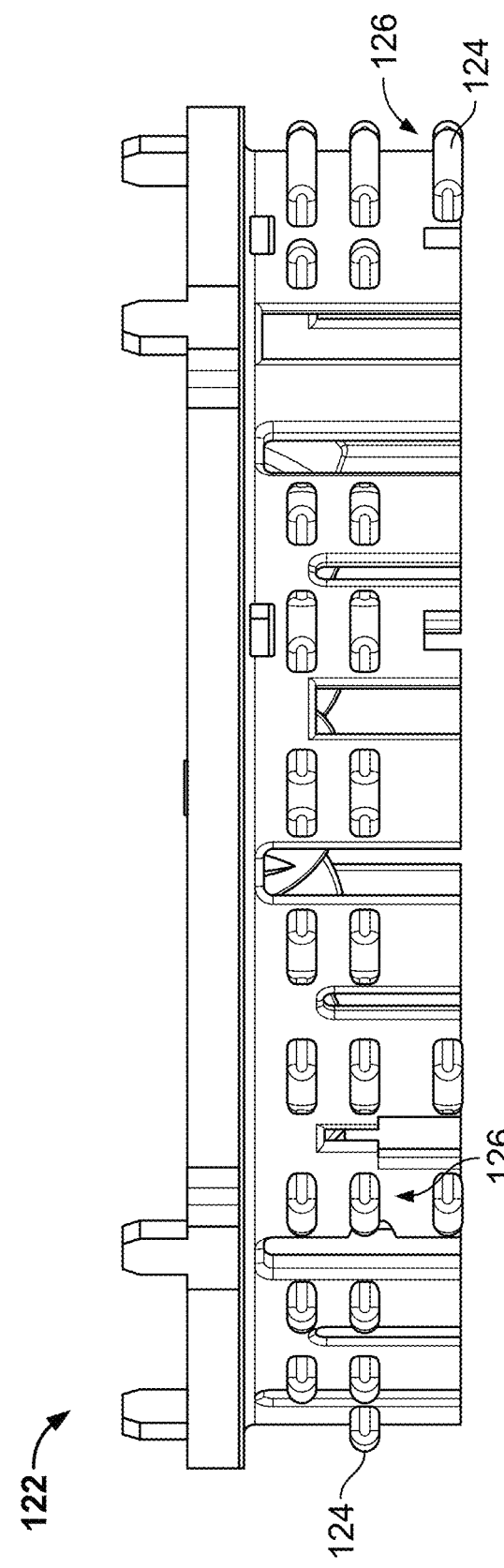

STATOR ASSEMBLIES FOR THREE PHASE DYNAMOELECTRIC MACHINES AND RELATED WINDING METHODS

CROSS-REFERENCE TO RELATED APPLICATION

This application is a continuation of U.S. patent application Ser. No. 14/727,526 filed Jun. 1, 2015. The entire disclosure of the above application is incorporated herein by reference.

FIELD

The present disclosure relates to stator assemblies for three phase dynamoelectric machines and related winding methods.

BACKGROUND

This section provides background information related to the present disclosure which is not necessarily prior art.

Stator assemblies for three phase dynamoelectric machines commonly include a stator core having a yoke and multiple teeth extending from the yoke toward a central opening. Typically, a winding wire is wound around a tooth to form a coil having two wire ends. This is repeated for each of the multiple teeth to form multiple coils each having their own wire ends. The different wire ends are then routed and bundled in groups for connecting to a power source. The power source may have different phases requiring the different wire ends to be connected to the proper phase.

SUMMARY

This section provides a general summary of the disclosure, and is not a comprehensive disclosure of its full scope or all of its features.

According to one aspect of the present disclosure, a stator assembly for a three phase dynamoelectric machine generally includes a non-segmented stator core including a stator yoke and a plurality of teeth extending from the stator yoke toward a central opening. The central opening extends from a first end of the stator core to a second end of the stator core opposite the first end. The plurality of teeth are spaced apart from one another and define a plurality of slots between the plurality of teeth for receiving windings of the stator assembly. The stator assembly also includes a plurality of coil portions electrically coupled in a delta winding pattern. The plurality of coil portions includes a first coil portion extending around a first one of the plurality of teeth and through slots on each side of the first one of the plurality of teeth, and a second coil portion extending around a second one of the plurality of teeth and through slots on each side of the second one of the plurality of teeth. The stator assembly further includes a plurality of connection portions including a first connection portion extending between the first coil portion and the second coil portion and electrically coupling the first coil portion and the second coil portion. The first coil portion, the second coil portion and the first connection portion are defined by a continuous length of winding wire.

According to another aspect of the present disclosure, a stator assembly for a three phase dynamoelectric machine generally includes a non-segmented stator core including a stator yoke and a plurality of teeth extending from the stator yoke toward a central opening. The central opening extends from a first end of the stator core to a second end of the stator core opposite the first end. The plurality of teeth are spaced apart from one another and define a plurality of slots between the plurality of teeth for receiving windings of the stator assembly. The stator assembly also includes a plurality of coil portions electrically coupled in a delta winding pattern. The plurality of coil portions includes a first coil portion extending around a first one of the plurality of teeth and through slots on each side of the first one of the plurality of teeth, and a second coil portion extending around a second one of the plurality of teeth and through slots on each side of the second one of the plurality of teeth. The stator assembly further includes a plurality of connection portions including a first connection portion extending between the first coil portion and the second coil portion and electrically coupling the first coil portion and the second coil portion. The stator assembly also includes a first end cap positioned on the first end of the stator core, and a second end cap positioned on a second end of the stator core. The second end cap is substantially identical in structure and configuration to the first end cap.

According to another aspect of the present disclosure a method of winding a stator assembly for a three phase dynamoelectric machine is disclosed. The stator assembly includes a non-segmented stator core including a stator yoke, a plurality of teeth extending from the stator yoke toward a central opening, and a plurality of coil portions electrically coupled in a delta winding pattern. The plurality of coil portions includes a first coil portion and a second coil portion. The central opening extends from a first end of the stator core to a second end of the stator core opposite the first end. The plurality of teeth are spaced apart from one another and define a plurality of slots between the plurality of teeth for receiving windings of the stator assembly. The method includes winding a wire around a first one of the plurality of teeth to form the first coil portion about the first one of the plurality of teeth, and routing the wire from the first one of the plurality of teeth to a second one of the plurality of teeth to form a connection portion between the first one of the plurality of teeth and the second one of the plurality of teeth. The method also includes winding the wire around a second one of the plurality of teeth to form the second coil portion about the second one of the plurality of teeth, such that the first coil portion, the connection portion and the second coil portion are defined by a continuous length of wire.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4A is a top view of the end cap of FIG. 3.

FIG. 4B is a bottom view of the end cap of FIG. 3.

Corresponding reference numerals indicate corresponding parts throughout the several views of the drawings.

DETAILED DESCRIPTION

Figure 1:
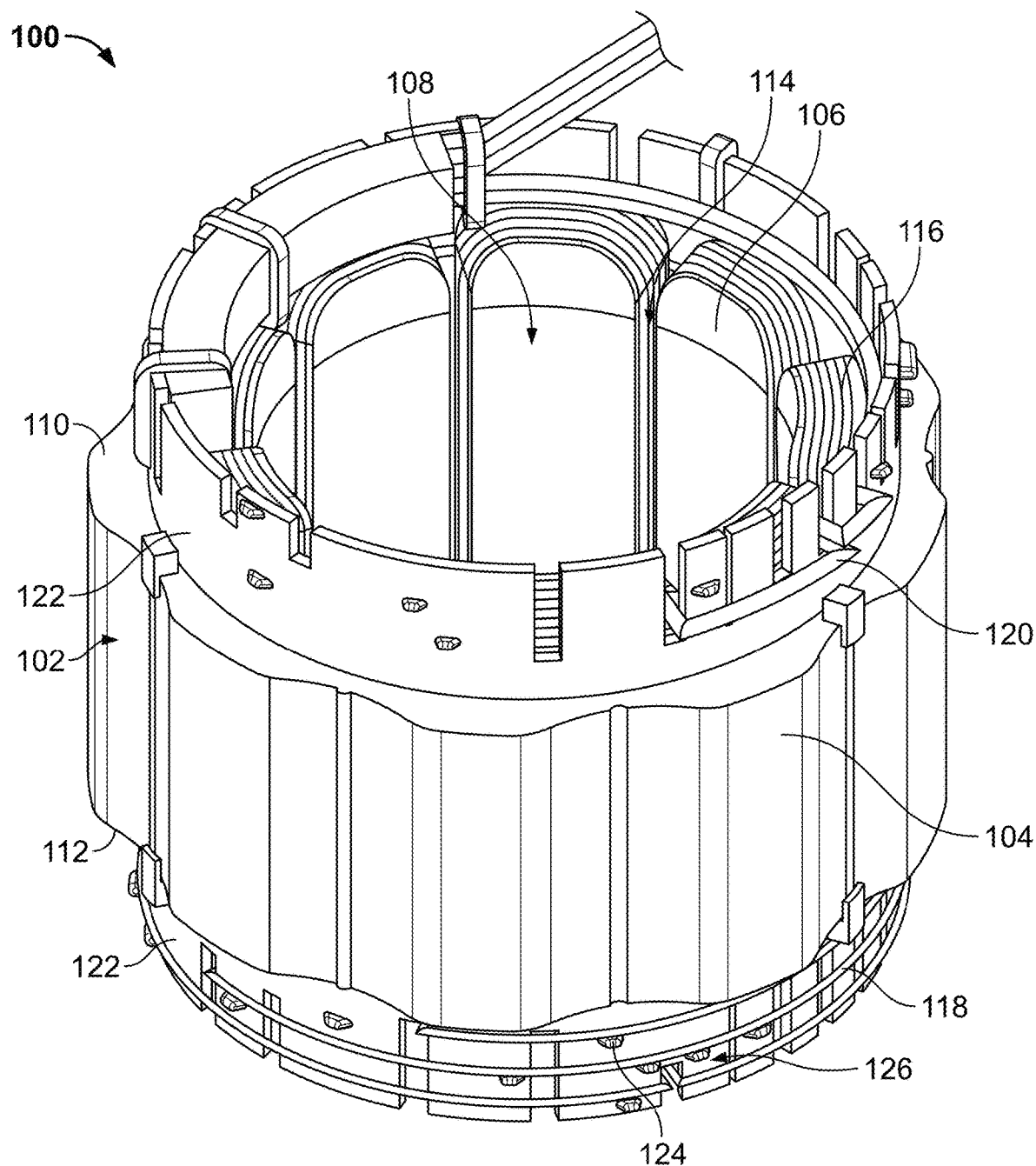
FIG. 1 is a perspective view of an example stator assembly according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A stator assembly for a three phase dynamoelectric machine according to one example embodiment of the present disclosure is illustrated in FIG. 1, and indicated generally by the reference number 100. As shown in FIG. 1, the stator assembly 100 includes a non-segmented stator core 102 including a stator yoke 104 and a plurality of teeth 106 extending from the stator yoke toward a central opening 108. The central opening 108 extends from one end 110 of the stator core 102 to another end 112 of the stator core. For example, the central opening 108 may extend from a lead end 110 of the stator core 102 to an opposite lead end 112 of the stator core. The plurality of teeth 106 are spaced apart from one another and define a plurality of slots 114 between the plurality of teeth for receiving windings of the stator assembly 100.

The stator assembly 100 also includes a plurality of coil portions 116 each extending around one of the plurality of teeth 106 and through slots 114 on each side of the tooth. The stator assembly 100 further includes a plurality of connection portions 118 each extending between two different coil portions 116 to electrically couple the two coil portions.

A continuous length of wire may define at least two coil portions 116 and a connection portion 118 between the two coil portions. For example, a continuous length of wire may be wound about a first tooth 106, routed from the first tooth over to a second tooth, and wound about the second tooth. Accordingly, a single continuous length of winding wire may define a first coil portion 116 about a first tooth, a connection 118 portion from the first tooth to a second tooth, and a second coil portion about the second tooth, such that the winding wire defining the two coil portions and the connection portion does not have any breaks, cuts, interruptions, multiple segments, etc.

The three phase dynamoelectric machine may be any suitable dynamoelectric machine, including a motor, a generator, etc. The dynamoelectric machine may include at least three terminals, which may form first, second and third pairs of terminals for coupling to first, second and third phases of a three phase electric power source.

The multiple coil portions 116 of the stator assembly 100 may include a first set of coil portions corresponding to a first phase of the dynamoelectric machine, a second set of coil portions corresponding to a second phase of the dynamoelectric machine and a third set of coil portions corresponding to a third phase of the dynamoelectric machine for coupling to a first phase, a second phase, and a third phase, respectively, of a three phase electric power source. Each phase may include coil portion(s) coupled between a different pair of terminals of the dynamoelectric machine. For example, the coil portions 116 belonging to the first set of coil portions may be coupled between a first pair of terminals of the dynamoelectric machine. The first pair of terminals may be configured for coupling to a first phase of a three phase electric power source, via any suitable coupling element(s), including lead portions, lead wire bundles, terminal connectors, etc. The second set of coil portions 116 may be coupled between a second pair of terminals of the dynamo electric machine (which may include one terminal of the first pair of terminals), and the second pair of terminals may be configured for coupling to a second phase of the three phase electric power source. Similarly, the third set of coil portions may be coupled between a third pair of terminals (which may include one terminal from the first pair and one terminal from the second pair), and the third pair of terminals may be configured for coupling to a third phase of the three phase electric power source. Accordingly, the first set of coil portions 116 may all be energized with the same power phase, the second set of coil portions may all be energized with a same power phase that is different from the first set of coil portions, and the third set of coil portions may all be energized with a same power phase that is different from the first set of coil portions and the second set of coil portions.

The stator assembly 100 may include a total of nine teeth 106 and a total of nine coil portions 116. Each of the nine coil portions 116 may be wound about a different one of the nine teeth and through slots 114 on each side of said different one of the nine teeth. Other embodiments may include more or less teeth 106 and more or less coil portions 116 (e.g., three teeth and three coil portions, six teeth and six coil portions, twelve teeth and twelve coil portions, etc.). The number of coil portions 116 may or may not correspond to the number of teeth 106 of the stator assembly 100, and each tooth 106 may include no coil portion, a single coil portion, more than one coil portion, etc.

Figure 2:
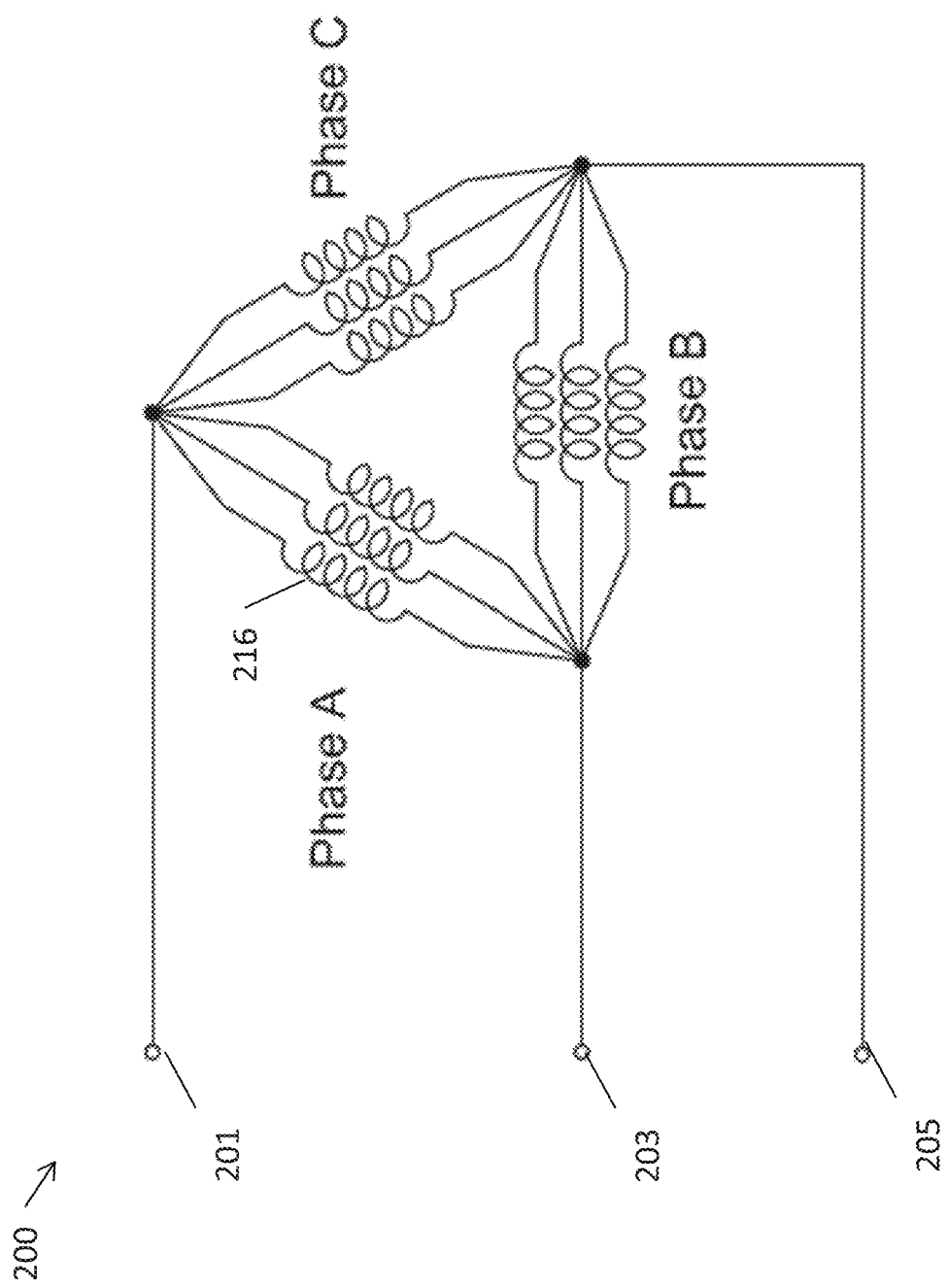
FIG. 2 is a diagram of an example delta winding connection pattern for a stator assembly.

The coil portions 116 may be electrically coupled in a delta winding pattern. An example delta winding pattern diagram 200 is shown in FIG. 2. The delta winding pattern 200 includes three different phase connection wires (201, 203, 205) for connecting to different phases of a three phase electric power source (not shown). Each coil portion 216 belongs to one of three different sets of coil portions (Phase A, Phase B, Phase C) and is coupled to a respective phases of the three phase electric power source via the phase connection wires 201, 203, 205.

Referring back to FIG. 1, adjacent coil portions 116 may belong to different ones of the sets of coil portions described above. For example, a coil portion 116 belonging to the first set of coil portions that is configured for coupling to a first phase of the three phase electric power source may be adjacent a coil portion belonging to the second set of coil portions on one side, and also adjacent a coil portion belonging to the third set of coil portions on the other side. The coil portions 116 may alternate to provide an even distribution of each set of coils around the stator assembly 100. For example, the coil portions may be ordered sequentially around the stator core 102 (e.g., in an order of a first phase coil portion, then a second phase coil portion, then a third phase coil portion, then starting over at a first phase coil portion, etc.).

Each connection portion 118 may extend between two coil portions 116 and electrically couple the two coil portions. For example, the connection portion 118 may include a length of winding wire connecting two coil portions. The connection portion 118 may be continuous, may be cut into one or more segments, etc. The connection portion 118 may be an intermediate portion of a continuous length of wire defining two coil portions 116 and the connection portion 118.

The connection portion 118 may include one or more lead portions 120. For example, the connection portion 118 may include a portion of winding wire that can be coupled to a phase connection wire of a three phase electric power source. The lead portion 120 may be a part of the connection portion 118 that extends out from the stator core 102 (e.g., via a bend in the winding wire, etc.) to be connected to a power source. Accordingly, a continuous length of wire may define a first coil portion 116, a connection portion 118 including a lead portion 120, and a second coil portion.

Each lead portion 120 of the plurality of connection portions 118 may be positioned in one of a first, second or third lead bundle for coupling to a first phase, a second phase, or a third phase, respectively, of a three phase electric power source. For example, the stator assembly 100 may include multiple lead portions 120 (e.g., six lead portions, nine lead portions, twelve lead portions, etc.). The multiple lead portions 120 may be positioned in bundles with other lead portions that are configured to connect to the same phase of a three phase electric power source. Once the lead portions 120 are bundled, each bundle can be coupled to its respective phase of the three phase power source.

The lead portions 120 of the stator assembly 100 may be routed through less than all of the slots 114 of the stator assembly, such that some slots may not contain any lead portions. Accordingly, the lead portions 120 may be grouped so that the lead portions are routed through only a subset of all of the slots 114. Lead portions 120 corresponding to the same phase of a three phase electric power supply may be routed through the same slots 114. Routing lead portions 120 through less than all of the slots 114 may provide one or more advantages, including reducing the need to manually route and couple lead portions from different slots, reducing the complexity of guiding the lead portions about the lead end of the stator core 102, etc.

In some embodiments, the lead portions 120 may be routed through no more than six slots 114 of the stator assembly 100. This may create six bundles of lead portions 120, which may require regrouping and routing of some of the lead portions. In some embodiments, the lead portions 120 may be routed through no more than four of the slots 114 of the stator assembly 100. This may reduce the amount of regrouping and routing of lead portions 120 that may be required when the lead portions extend from more than four slots. The regrouping and routing may include cutting one or more wires to combine the lead portions into three lead bundles.

In some embodiments, the lead portions 120 may be routed through no more than three of the slots 114 of the stator assembly 100. Routing the lead portions 120 through no more than three slots 114 may reduce the need to manually route and couple lead portions from different slots, as all lead portions may be properly grouped in three lead bundles. In other embodiments, the lead portions 120 may be routed through more or less (including none or all) or the slots 114 of the stator assembly 100.

The stator assembly 100 may include an end cap 122 positioned on an end of the stator core 102. The end cap 122 may be positioned at a lead end 110 of the stator core 102, an opposite lead end of the stator core 112, etc.

Figure 3:
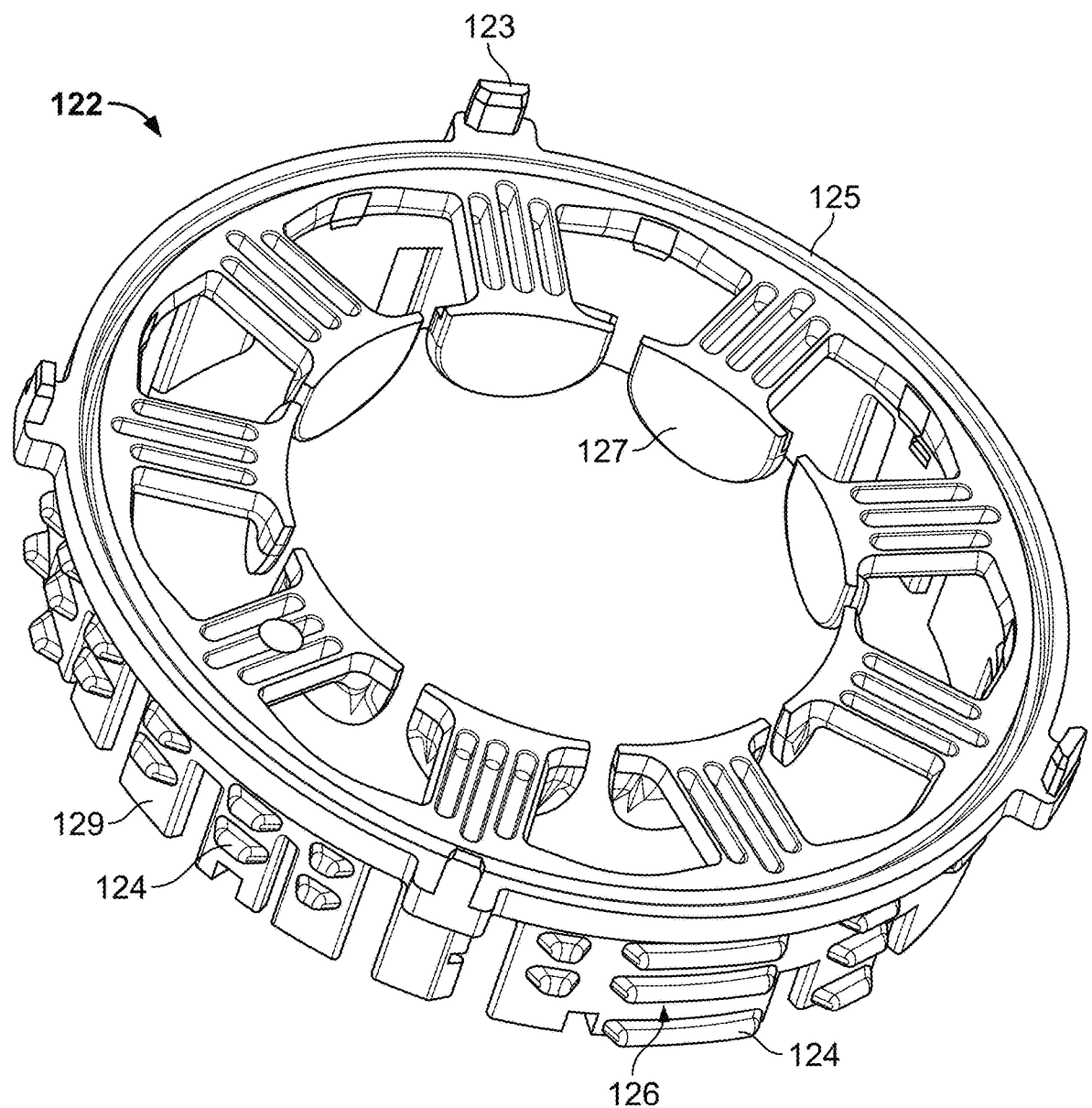
FIG. 3 is a perspective view of an end cap of FIG. 1.

An example end cap 122 is illustrated in FIGS. 3, 4A and 4B. The end cap 122 includes a yoke portion 125 which corresponds to a circumference of the yoke 104 of the stator core 102. The end cap 122 also includes tooth portions 127 which correspond to the teeth 106 of the stator core.

The end cap 122 may include a wall 129 extending from the yoke portion 125. The wall 129 may be discontinuous to allow routing of wire though and around the end cap 122. The wall 129 may keep the connection portions 118 of the wire tight, provide some tension, etc.

The end cap 122 includes a plurality of guides 124 for separating connection portions 118 corresponding to different phases to prevent shorting between the connection portions corresponding to the different phases. The guides 124 may be any suitable elements for separating the connection portions 118, including ribs, tabs, walls, etc.

The guides 124 may define routing paths 126 (e.g., trenches, channels, tracks, etc.) in which the different connection portions 118 are positioned. For example, as shown in FIG. 1, connection portions 118 corresponding to a first phase may be positioned on one side of a guide 124 in a first routing path 126, while connection portions corresponding to a second phase may be positioned on another side of the guide in a second routing path. Accordingly, the connection portions 118 in different routing paths 126 may not contact each other and therefore may not short one another as the connection portions are routed between different coil portions 116.

A routing path 126 may be any suitable path capable of separating portions of winding wire. As shown in FIG. 1, the end cap 122 may extend from an end of the stator core 102 parallel to a longitudinal direction of the teeth 106. The outer wall 129 of the end cap 122 includes multiple guides 124 which separate the outer wall of the end cap 122 into multiple routing paths 126. The routing paths 126 are portions of the end cap outer wall 129 that provide a surface along which the connection portions 118 are positioned. In the embodiment of FIG. 1, the routing paths 126 are flush with the outer wall surface of the end cap 122, and the guides 124 are only located intermittently along portions of the sides of the routing paths. Thus, the guides 124 may not fully define walls of a routing path 126. A routing path 126 may only have guides 124 on one side of the routing path. A routing path 126 may be flush with the surface of the wall 129 of the end cap 122. Accordingly, a routing path 126 may include sides defined at least partially by one or more guides 124 on at least one side of the routing path 126, and may have a surface defined by the wall 129 of the end cap 122. In other embodiments, the guides 124 may fully define a wall of a routing path 126 on a side of the routing path, the guides 124 may define walls of a routing path on both sides of the routing path, the routing path may be lowered with respect to the end cap wall surface, the routing path may include ruts, impressions, etc. for positioning the winding wire, etc.

The multiple guides 124 may define any suitable number of routing paths 126. For example, the multiple guides 124 may define no more than four routing paths 126 for routing the connection portions 118, no more than three routing paths for routing the connection portions, etc. The number of routing paths 126 may correspond to the number of phases that different connection portions 118 can connect to. For example, the end cap 122 may include three routing paths 126 when the stator assembly 100 includes connection portions 118 configured to connect to one of three different phases of a three phase electric power source. The number of routing paths 126 may be a minimum number of routing paths required to route the connection portions 118 without having any contact between connection portions corresponding to different phases. Other embodiments may include more or less (or none) routing paths 126.

The end cap 122 can be made out of any suitable material(s), including plastic, etc. The end cap 122 may be non-conductive to prevent shorting of different connection portions 118.

The stator assembly 100 may include two end caps 122, which may be positioned at opposite ends of the stator core 102. For example, one end cap may be positioned at a lead end of the stator core 102, while a second end cap is positioned at an opposite lead end of the stator core 102. The end cap at the opposite lead end of the stator core 102 may be used to route the connection portions 118 of the winding wire as the wire is routed from one coil portion to another coil portion. The end cap 124 at the lead end of the stator core 102 may be configured to route at least some of the lead portions 120 into lead bundles, guide routing of the lead portions as they are grouped into lead bundles, guide the lead portions out of the stator core for connection to a three phase electric power source, etc.

The end caps 122 at both ends of the stator core 102 may have substantially similar structure and configuration. For example, both end caps 122 may be identical, such that the end caps are interchangeable at either end. This may provide one or more advantages, including reducing the need to produce and store multiple end cap parts having different designs, reducing the need to manage proper selection and placement of different end cap designs at different locations on the stator core 102, etc.

The end caps 122 may not be symmetrical. Accordingly, some points of the end caps 122 may align at each end of the stator core 102 (e.g., twelve o'clock and six o'clock points, etc.), while other end cap features may be positioned at different locations at each end of the stator core. The end caps 122 may be designed such that some features correspond to the routing of the connection portions 118 at an opposite lead end of the stator core 102, while other features of the end cap correspond to the routing of the lead portions 120 at the lead end of the stator core.

The end cap 122 may include one or more locating tabs 123. The end cap 122 shown in FIG. 3 includes 4 locating tabs 123. Other embodiments may include more or less (or none) locating tabs 123. The locating tabs 123 may have different sizes, different shapes, etc., which may provide clocking such that the end cap 122 has a correct orientation with respect to the stator core 102. The locating tabs may cooperate with grooves in the stator core 102 (e.g., grooves in laminations of the stator core, etc.). The locating tabs 123 may provide alignment of the end cap 122, and may prevent rotation of the end cap.

The stator assembly 100 may include one or more continuous lengths of winding wire. For example, all coil portions 116 and connection portions 118 may be defined by one continuous length of winding wire. One continuous length of winding wire may be wound about all of the teeth 106 of the stator assembly 100.

In some embodiments, the stator assembly 100 may include multiple continuous lengths of winding wire (i.e., multiple continuous winding wire segments). For example, a continuous length of wire may be wound about all teeth 106 of the stator assembly 100, and then cut at one or more points to form wire segments. Each cut may create two additional wire ends and one additional wire segment. In some embodiments, all coil portions 116 and connection portions 118 may be defined by no more than four continuous lengths of winding wire (e.g., four wire segments having a total of eight wire ends formed by three cuts of one continuous length of wire). Some embodiments may include all coil portions 116 and connection portions defined by no more than three continuous lengths of winding wire (e.g., three wire segments having a total of six wire ends formed by two cuts of one continuous length of wire). Some embodiments may include all coil portions 116 and connection portions defined by no more than two continuous lengths of winding wire (e.g., two wire segments having a total of four wire ends formed by one cut of one continuous length of wire). In other embodiments, more or less continuous lengths of winding wire may define the coil portions 116 and connection portions 118. The continuous lengths of winding wire may be formed by cutting winding wire, winding multiple wires separately, etc.

Figure 5:
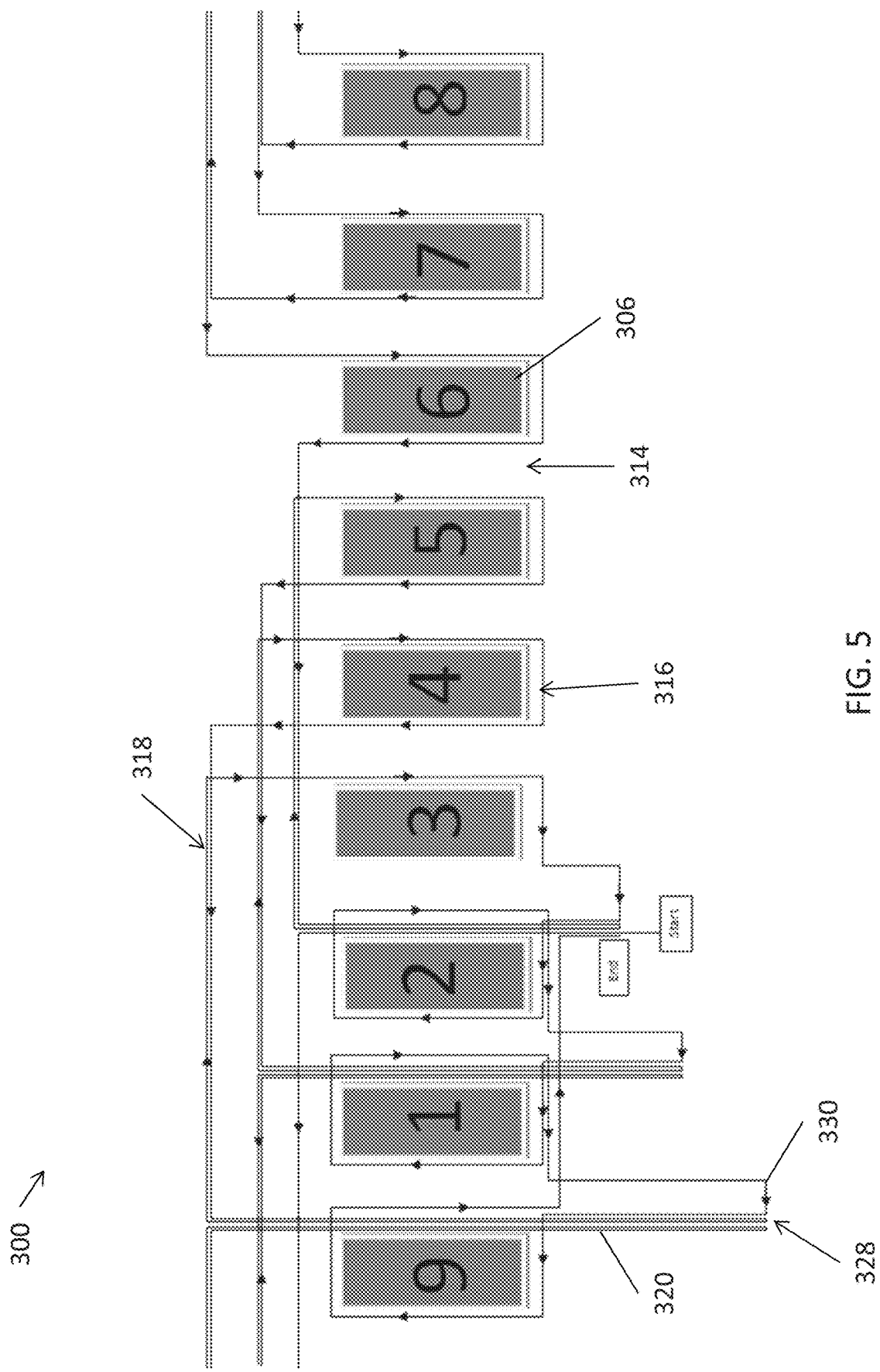
FIG. 5 is a diagram of an example winding pattern for a stator assembly having some lead portions wound outside of an end cap according to one example embodiment of the present disclosure.

FIG. 5 illustrates a winding pattern 300 for a stator assembly, which may be similar to the stator assembly 100 of FIG. 1. The winding pattern 300 includes a continuous length of wire wound about all nine teeth 306 of the stator assembly. The arrows of the length of wire indicate a direction of winding of the wire, from a start point of the wire to an end point of the wire.

The winding pattern 300 includes coil portions 316 about each tooth 306 of the stator assembly. Although the winding pattern 300 illustrates only one turn about each tooth 306, any suitable number of turns (e.g., 70 turns, 80 turns, etc.) may be used.

The winding pattern 300 includes connection portions 318 between coil portions 316. The connection portions 316 are separated into three layers. These 3 layers may correspond to different routing paths 126 of the end cap 122 illustrated in FIG. 1 (not shown in FIG. 5). For example, the top layer of the connection portions 318 in the winding pattern 300 may be positioned in a routing path 126 of the end cap 122 that is furthest from an end 112 of the stator core, the middle layer of connection portions 318 may be positioned in the middle routing path of the end cap, and the bottom layer of connection portions 318 may be positioned in the routing path closest to the end of the stator core.

Although the connection portion 318 cross over one another at some locations in the winding pattern 300, connection portions 318 connecting to different phases of a three phase electric power source may be separated from contacting one another by the end cap 122. For example, when connection portions 318 from different layers are shown as overlapping in winding pattern 300, the end cap 122 may instead route the connection portions 318 on different sides of the end cap at those points.

Each connection portion 318 also includes a lead portion 320 which extends out from one of the slots 314 between the teeth 306. For example, each connection portion 318 begins from one coil portion 316 about a first tooth, defines a lead portion which extends though one of the slots 314, and then extends to another tooth to from another coil portion.

The lead portions 120 may be bundled together to form lead bundles 328. For example, winding pattern 300 includes three lead bundles 328. These lead bundles may include only lead portions 320 corresponding to the same phase of a three phase electric power source. Once bundled, the lead bundles 328 can be connected to the power source.

As shown in FIG. 5, the winding pattern 300 includes lead portions 320 extending from four of the nine slots 314 of the stator assembly. Each lead bundle includes lead portions 320 extending from a different slot 314. For example, one lead bundle 328 includes five lead portions 320 extending from the slot 314 between the ninth tooth 306 and the first tooth, and a sixth lead portion extending from the slot between the first tooth and the second tooth. The sixth lead portion 320 belonging to this bundle may be routed outside an end cap to the other lead portion in the same bundle. For example, the stator assembly may include end caps 122 on both sides as shown in FIG. 1 (not shown in FIG. 5). The connection portions 318 are routed in layers through an end cap 122 at one end of the stator core 102, while some lead portions are routed around an end cap at the other end of the stator core. The lead portions 320 being routed horizontally at a position away from the teeth 306 indicates those lead portions are routed outside the end cap 122.

The lead portions 320 which are routed from one slot 314 over to the rest of the lead portion in the same bundle may be cut and repositioned in the bundle for easier bundling. For example, a winding machine may wind the wire through the stator assembly according to the winding pattern 300 of FIG. 5, and then a technician, machine, etc. may cut the lead portions 320 at locations 330 and reposition those cut lead potions in the respective bundle. This may make the winding process more efficient as the machine may more easily wind some lead portion 320 in different slots 314 and outside the end cap 122 at the lead end of the stator core 102. Accordingly, this embodiment may include four continuous lengths of wire that define all coil portions 316 and connection portions 318.

In some embodiments, the winding wire may be wound through the teeth in a winding pattern to increase slot fill in the slots 314. The winding wire may be wound to maximize the slot fill.

Figure 6:
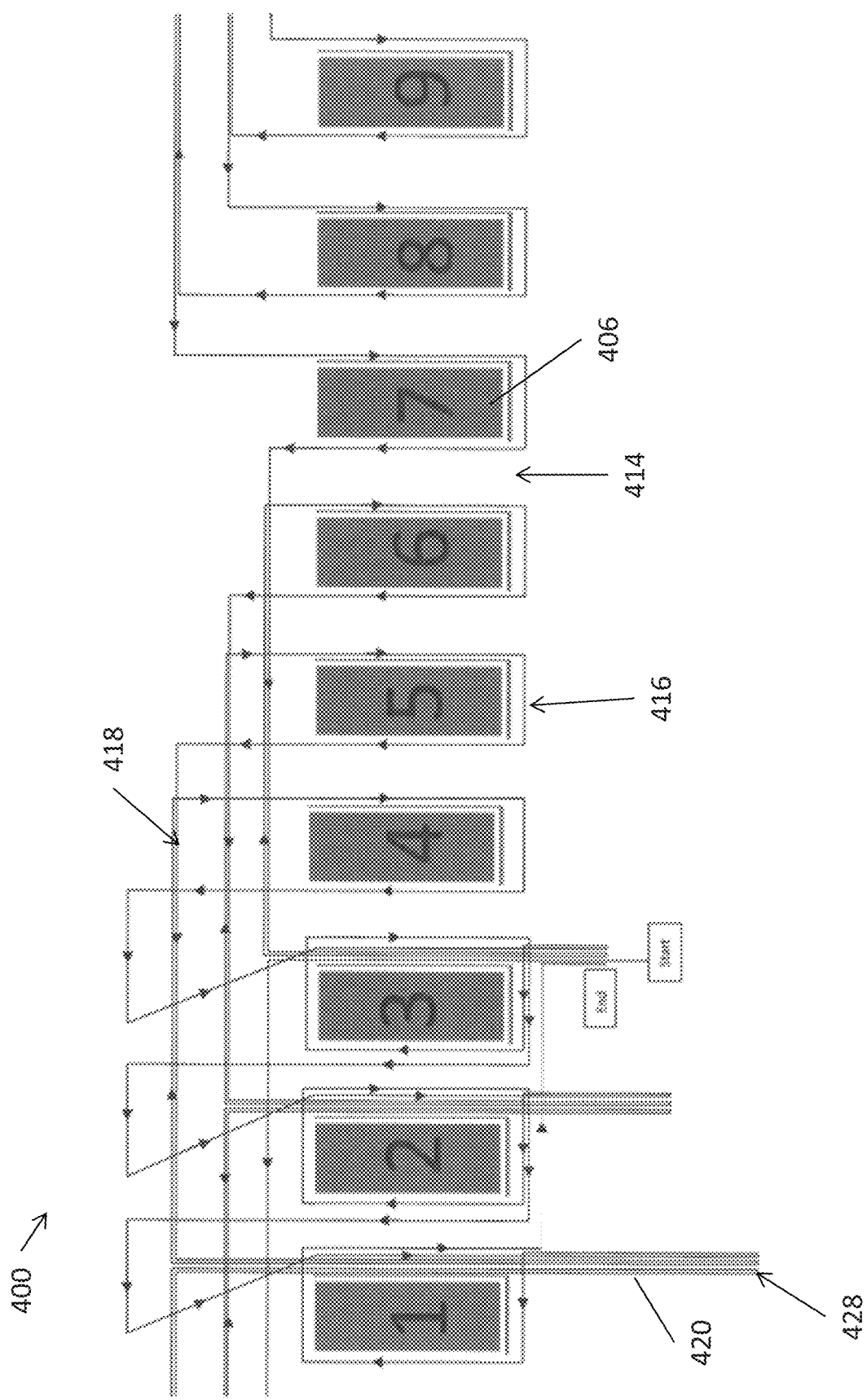
FIG. 6 is a diagram of another example winding pattern for a stator assembly having four connection portion layers according to another example embodiment of the present disclosure.

FIG. 6 illustrates another example winding pattern 400, which has some similarities to the winding pattern 300 of FIG. 5. Winding pattern 400 includes coil portions 416, connection portions 418, lead portions 420, and lead bundles 428.

The connection portions 418 in winding pattern 400 are divided into 4 layers (comparted to only 3 layers in winding pattern 300 of FIG. 5). Accordingly, an end cap design would require four routing paths 126 to accommodate the 4 layers of connection portions 418 in winding pattern 400.

As shown in FIG. 6, the winding pattern 400 includes lead portions 420 extending from only three slots 414 (as opposed to four slots 314 in FIG. 5). All lead portions 420 belonging to the same bundle 428 extend from the same slot 414. For example, all lead portions 420 belonging to the first bundle 428 extend from the slot 414 between the first tooth 406 and the second tooth. This is in contrast to the winding pattern 300 in which lead portions 320 belonging to the same bundle 328 can extend from different slots 314.

Winding pattern 400 includes a single continuous length of wire that defines all coil portions 418, connection portions 418 and lead portions 420.

Figure 7:
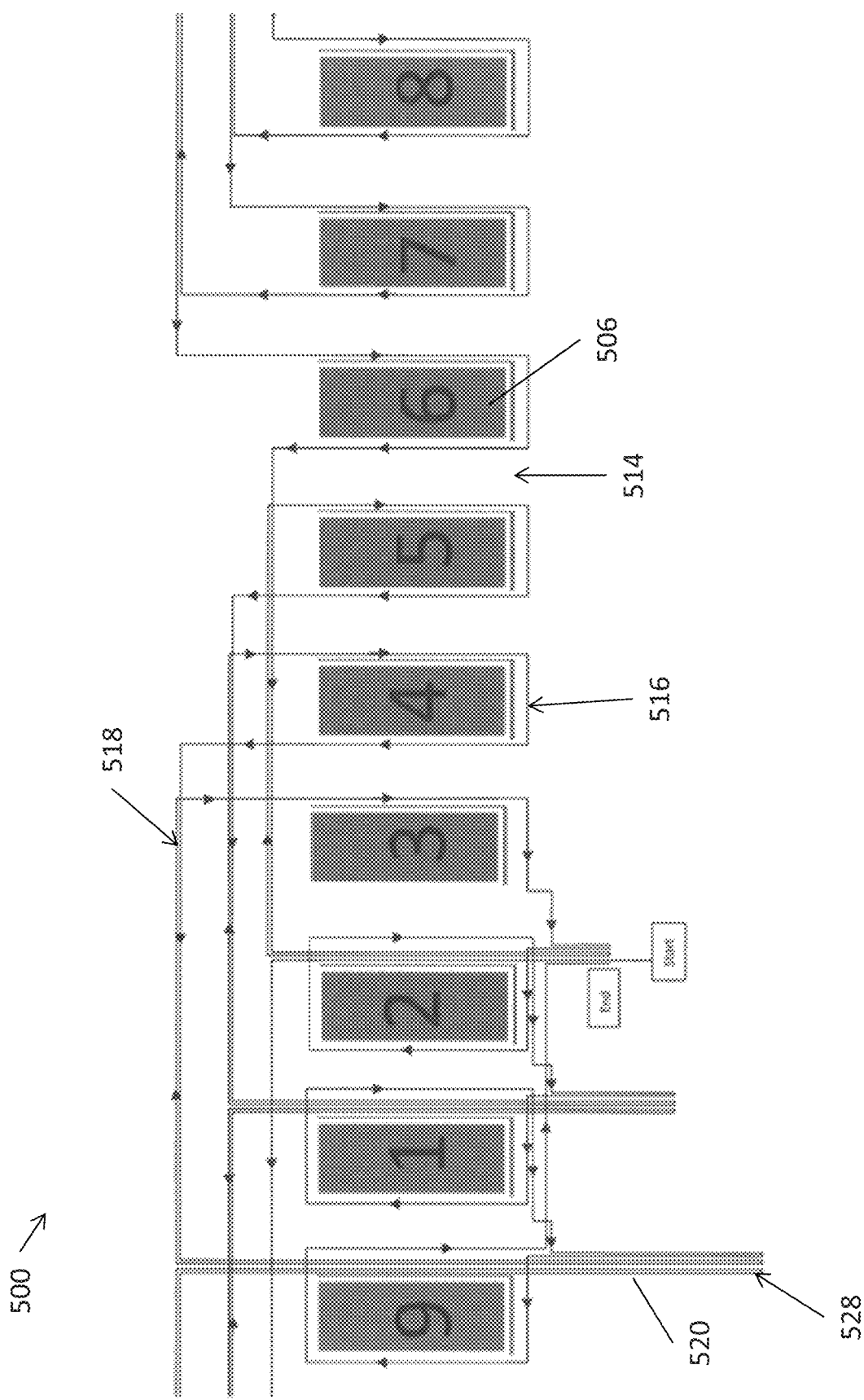
FIG. 7 is a diagram of another example winding pattern for a stator assembly having some lead portions wound inside of an end cap according to another example embodiment of the present disclosure.

FIG. 7 illustrates another example winding pattern 500, which has some similarities to the winding pattern 300 of FIG. 5. Winding pattern 500 includes coil portions 516, connection portions 518, lead portions 520, and lead bundles 528.

Each lead bundle 528 includes lead portions 520 which extend from different slots 514 (similar to winding pattern 300 of FIG. 5), but the lead portions 520 belonging to the same lead bundle 520 are routed together on the inside of the end cap 122, as opposed to the outside of the end cap in winding pattern 300 of FIG. 5. This is indicated by the lead portions 520 being routed horizontally from one slot to another at a location very close to the end of the teeth 506.

The winding pattern 500 includes lead portions 520 extending from four of the nine slots 514. Because the lead portions 520 are routed to respective lead bundles 528 on the inside of the end cap 122, there may be no need to cut the winding wire. Accordingly, all coil portions 516, connection portions 518 and lead portions 520 may be defined by a single continuous length of wire.

Figure 8:
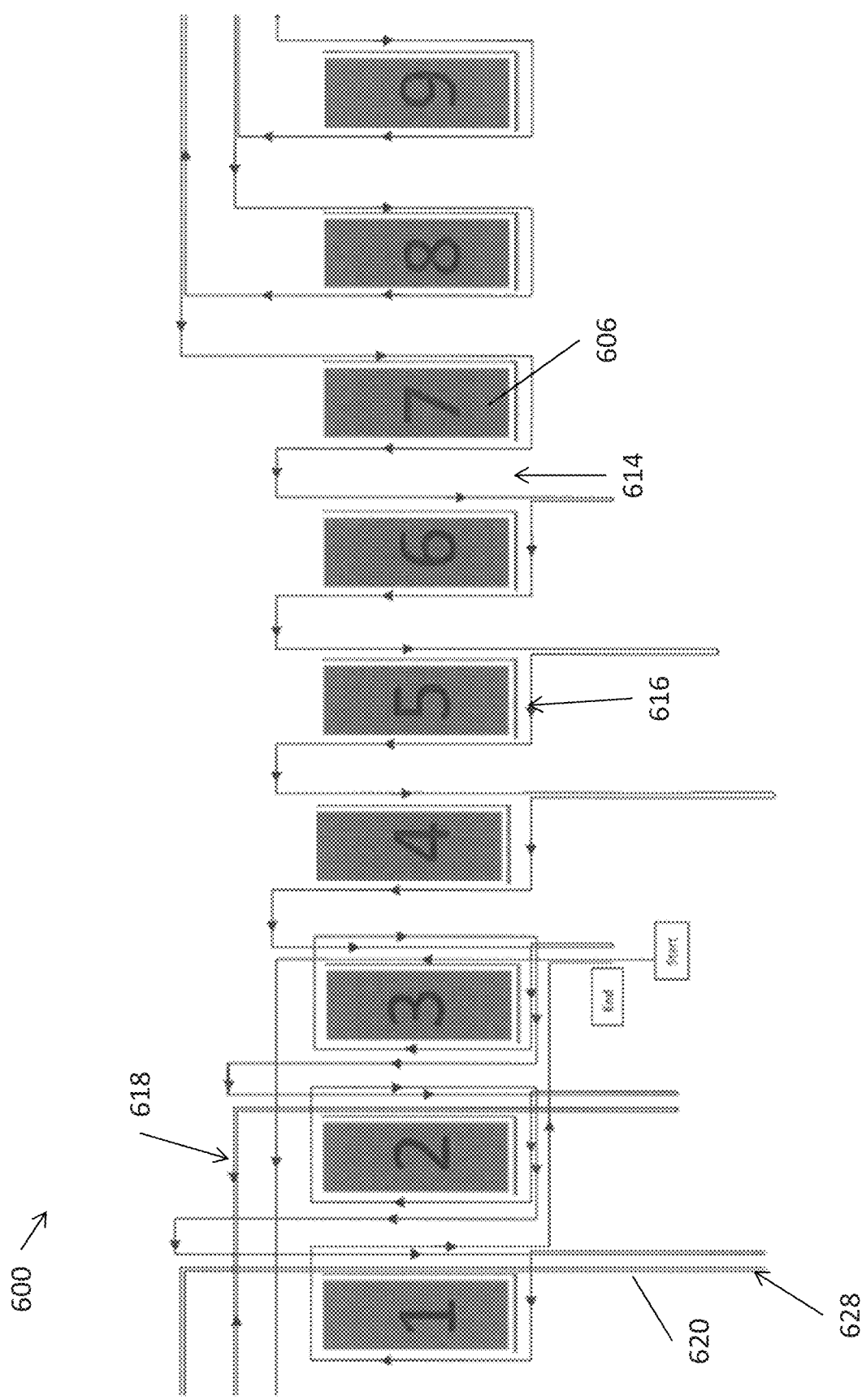
FIG. 8 is a diagram of another example winding pattern for a stator assembly having six lead portion bundles according to another example embodiment of the present disclosure.

FIG. 8 illustrates another example winding pattern 600 including coil portions 616, connection portions 618, lead portions 620, and lead bundles 628. Winding pattern 600 includes six lead bundles 628, as opposed to the three lead bundles of winding patterns 300, 400 and 500. Accordingly, the winding pattern 600 includes lead portions 620 extending from six of the nine slots 614.

The lead bundles 628 may have to be manually combined to form only three lead bundles for connecting to three phases of a three phase electric power source. The winding pattern 600 may not require any cutting of the winding wire. Accordingly, the winding pattern 600 man include a single continuous length of wire defining all coil portions 616, connection portions 618 and lead portions 620.

The example stator assembly 100 of FIG. 1 may include any winding pattern described herein (e.g., winding patterns 300, 400, 500 and 600), or may include any other suitable winding pattern, and the winding patterns described herein may be implemented in the example stator assemblies described herein or any other suitable stator assemblies.

The stator core 102 may be any suitable stator core having any suitable size and shape. In some embodiments, the stator may have a frame size of 63, a frame size of 70, etc. The stator assembly 100 may be used in any suitable implementation, including variable speed motors, fixed speed motors, etc.

The coil portions may be any suitable coils wound about the teeth 106 of the stator core 102. In some embodiments, the coil potions 116 may each include the same number of turns. The coil portions 116 may each include between about 70 to 80 turns. Other embodiments may include more or less turns per coil portion, and different coil portions may include different numbers of turns.

The winding wire may include any suitable wire, which may comprise any suitable conductor material(s). For example, the winding wire may include copper, aluminum, a compound alloy, etc.

The winding wire may be any suitable size. In some embodiments, the winding wire may have a wire gauge in the range of 18 to 19 AWG. The winding wire may preferably have a wire gauge of 18.5 AWG. Other embodiments may include winding wire having a different wire gauge.

The end cap 122 may allow for the winding wire to not include any sleeve covering any connection portions of the winding wire. For example, the guides 124 of the end cap 122 may separate connection portions 118 corresponding to different phases of a three phase electric power source, such that no sleeve is needed to cover the connection portions as they are routed between coil portions. Although a sleeve is not required, one or more sleeves can still be used if desired.

In some embodiments, the stator assembly 100 may be assembled into a compressor. Accordingly, a compressor may include the stator assembly 100, which may be combined with a rotor, etc.

According to another example embodiment, a method of winding a stator assembly for a three phase dynamoelectric machine is disclosed. The method may be implemented with any example stator assemblies described herein, or with other stator assemblies, and may form any of the winding patterns described herein (e.g., winding pattern 300, 400, 500, and 600) or any other suitable winding patterns.

The example method includes winding a wire around a first one of a plurality of teeth of a stator core to form a first coil portion about the first tooth, routing the wire from the first one of the plurality of teeth to a second one of the plurality of teeth to form a connection portion between the first tooth and the second tooth, and winding the wire around the second tooth to form a second coil portion about the second tooth, such that the first coil portion, the connection portion and the second coil portion are defined by a continuous length of wire.

Winding the wire according to this example method creates two coil portions and a connection portion between the two coil portions which is defined by a continuous length of wire, such that coil portions about different teeth are connected by a continuous length of wire. The method may also include winding the continuous wire around the remaining teeth to form coils about each of the remaining teeth, such that all coil portions are defined by a continuous length of winding wire.

Winding the wire around the remaining teeth may include routing the wire between coil portions in a delta connection winding pattern to define lead portions of the winding wire positioned in one of a first, second or third lead bundle for coupling to a first phase, a second phase, or a third phase, respectively, of a three phase electric power source. For example, the wire may be wound to form a delta connection winding pattern in which each coil portion corresponds to one of the three phases of the dynamoelectric machine. When routing the wire from one coil portion to another, a lead portion may be defined (e.g., by routing the wire out of the stator core and back into the stator core, etc.). Each lead portion may be routed to form a lead bundle with other lead portions that correspond to the same phase of the electric power source.

The example method may include cutting at least one lead portion to define two wire ends. The two wire ends may be bundled together with other lead portions that correspond to the same phase. Accordingly, a lead portion may be cut and then bundled together to form a lead bundle. The cutting of one or more lead portions may be done after a continuous length of wire has been wound about all of the multiple teeth of the stator core. The cutting of one or more lead portions may allow for easier bundling of the lead portions for connection to phases of the three phase electric power source.

The example method may be implemented using a winding machine to automatically wind the wire about the multiple teeth of the stator core. For example, a winding machine may use a single needle to thread, guide, route, etc. a continuous length of winding wire around the multiple teeth, and from one tooth to another tooth. The winding wire machine may wind the wire in a delta winding pattern with lead portions that extend out of the stator core for coupling to different phases of a three phase electric power source. The winding wire machine may route the wire from one tooth to another via an end cap, and may separate connection portions into respective routing paths of the end cap based on different phases of connection portions.

The winding machine may be any suitable machine configured to wire stator assemblies. The winding machine may be a single needle winding machine. For example, the winding machine may use a single needle to wind a single continuous length of winding wire about all teeth of a stator assembly. Other embodiments may use more than one winding needle.

The winding machine may move the single needle vertically and move the stator assembly horizontally to wind the wire about the multiple teeth of the stator assembly. Other embodiments may move the needle and stator assembly in other suitable directions.

The example method may also include assembling the stator assembly into a compressor after winding the wire around the plurality of teeth. Once the stator assembly is wound, the stator assembly may be assembled into a compressor, which may include assembling the stator assembly with other suitable compressor components, a rotor, etc.

The winding machine may use any suitable winding pattern for winding the stator assembly. For example, FIG. 5 illustrates an example winding pattern in which a method of winding the wire may include routing the wire from the first end of the stator assembly to the second end of the stator assembly through a slot between the second tooth (indicated by tooth #2 in FIG. 5) and the third tooth (indicated by tooth #3 in FIG. 5) to form a lead portion belonging to a first lead bundle, routing the wire along the second end cap to the eighth tooth, and winding the wire about the eighth tooth to form a coil portion about the eighth tooth, routing the wire along the second end cap from the eighth tooth to a slot between the first tooth and the second tooth, routing the wire through the slot between the first tooth and the second tooth twice to form another lead portion belonging to a second lead bundle, and routing the wire along the second end cap to the seventh tooth, to form a connection portion between the eighth tooth and the seventh tooth, winding the wire about the seventh tooth to form a coil portion about the seventh tooth, routing the wire along the second end cap from the seventh tooth to a slot between the ninth tooth and the first tooth, routing the wire through the slot between the ninth tooth and the first tooth twice to form another lead portion belonging to a third lead bundle, routing the wire along the second end cap to the sixth tooth, winding the wire about the sixth tooth, routing the wire along the second end cap from the sixth tooth to the slot between the second tooth and the third tooth, routing the wire through the slot between the second tooth and the third tooth twice to form another lead portion belonging to the first lead bundle, routing the wire along the second end cap to the fifth tooth, winding the wire about the fifth tooth, routing the wire along the second end cap from the fifth tooth to the slot between the first tooth and the second tooth, routing the wire through the slot between the first tooth and the second tooth twice to form another lead potion belonging to the second lead bundle, routing the wire along the second end cap to the fourth tooth, winding the wire about the fourth tooth, routing the wire along the second end cap from the fourth tooth to the slot between the ninth tooth and the first tooth, routing the wire through the slot between the ninth tooth and the first tooth twice to form another lead portion belonging to the third lead bundle, routing the wire along the second end cap to the third tooth, winding the wire about the third tooth, routing the wire along the outside of the first end cap from the third tooth to the second tooth to form another lead portion belonging to the first lead bundle, winding the wire about the second tooth, routing the wire along the outside of the first end cap from the second tooth to the first tooth to form another lead portion belonging to the second lead bundle, winding the wire about the first tooth, routing the wire outside of the first end cap from the first tooth to the ninth tooth to form another lead portion belonging to the third lead bundle, winding the wire about the ninth tooth, and routing the wire along the first end cap from the ninth tooth to the slot between the second tooth and the third tooth to form another lead portion belonging to the first lead bundle.

As another example, FIG. 6 illustrates an example winding pattern in which a method for winding the stator assembly may include routing the wire from the first end of the stator assembly to the second end of the stator assembly through a slot between the third tooth and the fourth tooth to form a lead portion belonging to a first lead bundle, routing the wire along the second end cap to the ninth tooth, and winding the wire about the ninth tooth to form a coil portion about the ninth tooth, routing the wire along the second end cap from the ninth tooth to a slot between the second tooth and the third tooth, routing the wire through the slot between the second tooth and the third tooth twice to form another lead portion belonging to a second lead bundle, and routing the wire along the second end cap to the eight tooth, to form a connection portion between the ninth tooth and the eighth tooth, winding the wire about the eighth tooth to form a coil portion about the eighth tooth, routing the wire along the second end cap from the eighth tooth to a slot between the first tooth and the second tooth, routing the wire through the slot between the first tooth and the second tooth twice to form another lead portion belonging to a third lead bundle, routing the wire along the second end cap to the seventh tooth, winding the wire about the seventh tooth, routing the wire along the second end cap from the seventh tooth to the slot between the third tooth and the fourth tooth, routing the wire through the slot between the third tooth and the fourth tooth twice to form another lead portion belonging to the first lead bundle, routing the wire along the second end cap to the sixth tooth, winding the wire about the sixth tooth, routing the wire along the second end cap from the sixth tooth to the slot between the second tooth and the third tooth, routing the wire through the slot between the second tooth and the third tooth twice to form another lead potion belonging to the second lead bundle, routing the wire along the second end cap to the fifth tooth, winding the wire about the fifth tooth, routing the wire along the second end cap from the fifth tooth to the slot between the first tooth and the second tooth, routing the wire through the slot between the first tooth and the second tooth twice to form another lead portion belonging to the third lead bundle, routing the wire along the second end cap to the fourth tooth, winding the wire about the fourth tooth, routing the wire along the second end cap from the fourth tooth to a slot between the third tooth and the fourth tooth, routing the wire through the slot between the third tooth and the fourth tooth once to form another lead portion belonging to the first lead bundle, winding the wire about the third tooth, routing the wire along the second end cap from the third tooth to the second tooth, routing the wire trough the slot between the second tooth and the third tooth once to form another lead portion belonging to the second lead bundle, winding the wire about the second tooth, routing the wire along the second end cap from the second tooth to the slot between the first tooth and the second tooth, routing the wire through the slot between the first tooth and the second tooth once to form another lead portion belonging to the third lead bundle, winding the wire about the first tooth, and routing the wire along the first end cap from the first tooth to the slot between the third tooth and the fourth tooth to form another lead portion belonging to the first lead bundle.

As another example, FIG. 7 illustrates an example winding pattern in which a method for winding the stator assembly may include routing the wire from the first end of the stator assembly to the second end of the stator assembly through a slot between the second tooth and the third tooth to form a lead portion belonging to a first lead bundle, routing the wire along the second end cap to the eighth tooth, and winding the wire about the eighth tooth to form a coil portion about the eighth tooth, routing the wire along the second end cap from the eighth tooth to a slot between the first tooth and the second tooth, routing the wire through the slot between the first tooth and the second tooth twice to form another lead portion belonging to a second lead bundle, and routing the wire along the second end cap to the seventh tooth, to form a connection portion between the eighth tooth and the seventh tooth, winding the wire about the seventh tooth to form a coil portion about the seventh tooth, routing the wire along the second end cap from the seventh tooth to a slot between the ninth tooth and the first tooth, routing the wire through the slot between the ninth tooth and the first tooth twice to form another lead portion belonging to a third lead bundle, routing the wire along the second end cap to the sixth tooth, winding the wire about the sixth tooth, routing the wire along the second end cap from the sixth tooth to the slot between the second tooth and the third tooth, routing the wire through the slot between the second tooth and the third tooth twice to form another lead portion belonging to the first lead bundle, routing the wire along the second end cap to the fifth tooth, winding the wire about the fifth tooth, routing the wire along the second end cap from the fifth tooth to the slot between the first tooth and the second tooth, routing the wire through the slot between the first tooth and the second tooth twice to form another lead potion belonging to the second lead bundle, routing the wire along the second end cap to the fourth tooth, winding the wire about the fourth tooth, routing the wire along the second end cap from the fourth tooth to the slot between the ninth tooth and the first tooth, routing the wire through the slot between the ninth tooth and the first tooth twice to form another lead portion belonging to the third lead bundle, routing the wire along the second end cap to the third tooth, winding the wire about the third tooth, routing the wire along the inside of the first end cap from the third tooth to the second tooth to form another lead portion belonging to the first lead bundle, winding the wire about the second tooth, routing the wire along the inside of the first end cap from the second tooth to the first tooth to form another lead portion belonging to the second lead bundle, winding the wire about the first tooth, routing the wire inside of the first end cap from the first tooth to the ninth tooth to form another lead portion belonging to the third lead bundle, winding the wire about the ninth tooth, and routing the wire along the first end cap from the ninth tooth to the slot between the second tooth and the third tooth to form another lead portion belonging to the first lead bundle.

As another example, FIG. 8 illustrates an example winding pattern in which a method for winding the stator assembly may include routing the wire from the first end of the stator assembly to the second end of the stator assembly through a slot between the third tooth and the fourth tooth to form a lead portion, routing the wire along the second end cap to the ninth tooth, and winding the wire about the ninth tooth to form a coil portion about the ninth tooth, routing the wire along the second end cap from the ninth tooth to a slot between the second tooth and the third tooth, routing the wire through the slot between the second tooth and the third tooth twice to form another lead portion, and routing the wire along the second end cap to the eighth tooth, to form a connection portion between the ninth tooth and the eighth tooth, winding the wire about the eighth tooth to form a coil portion about the eighth tooth, routing the wire along the second end cap from the eighth tooth to a slot between the first tooth and the second tooth, routing the wire through the slot between the first tooth and the second tooth twice to form another lead portion, routing the wire along the second end cap to the seventh tooth, winding the wire about the seventh tooth, routing the wire along the second end cap from the seventh tooth to the slot between the sixth tooth and the seventh tooth, routing the wire through the slot between the sixth tooth and the seventh tooth once to form another lead portion, winding the wire about the sixth tooth, routing the wire along the second end cap from the sixth tooth to the slot between the fifth tooth and the sixth tooth, routing the wire through the slot between the fifth tooth and the sixth tooth once to form another lead potion, winding the wire about the fifth tooth, routing the wire along the second end cap from the fifth tooth to the slot between the fourth tooth and the fifth tooth, routing the wire through the slot between the fourth tooth and the fifth tooth once to form another lead portion, winding the wire about the fourth tooth, routing the wire along the second end cap from the fourth tooth to the slot between the third tooth and the fourth tooth, routing the wire through the slot between the third tooth and the fourth tooth to form another lead portion, winding the wire about the third tooth, routing the wire along the second end cap from the third tooth to slot between the second tooth and the third tooth, routing the wire through the slot between the second tooth and the third tooth once to form another lead portion, winding the wire about the second tooth, routing the wire along the second end cap from the second tooth to the slot between the first tooth and the second tooth, routing the wire through the slot between the first and second tooth once to form another lead portion, winding the wire about the first tooth, and routing the wire along the first end cap from the first tooth to the slot between the third tooth and the forth tooth to form another lead portion.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of winding a stator assembly for a three phase dynamoelectric machine, the stator assembly including a non-segmented stator core including a stator yoke, a plurality of teeth extending from the stator yoke toward a central opening, an end cap and a plurality of coil portions electrically coupled in a delta winding pattern, the plurality of coil portions including a first coil portion and a second coil portion, the central opening extending from a first end of the stator core to a second end of the stator core opposite the first end, the plurality of teeth spaced apart from one another and defining a plurality of slots between the plurality of teeth for receiving windings of the stator assembly, the end cap positioned on the first end of the stator core and including a plurality of guides defining multiple routing paths for routing connection portions, different ones of the multiple routing paths receiving connection portions corresponding to different phases of the three phase delta winding pattern, the method comprising:
    winding a wire around a first one of the plurality of teeth to form the first coil portion about the first one of the plurality of teeth;
    routing the wire from the first one of the plurality of teeth to a second one of the plurality of teeth to form a connection portion between the first one of the plurality of teeth and the second one of the plurality of teeth, the connection portion routed in one of the multiple routing paths defined by the plurality of guides of the end cap; and winding the wire around the second one of the plurality of teeth to form the second coil portion about the second one of the plurality of teeth such that the first coil portion, the connection portion and the second coil portion are defined by a continuous length of wire.

2. The method of claim 1, further comprising:
winding the continuous length of wire around remaining teeth of the plurality of teeth to form coil potions about each of the remaining teeth of the plurality of teeth, such that all coil portions are defined by a continuous length of wire.

3. The method of claim 2, wherein winding the wire around the remaining teeth of the plurality of teeth includes routing the wire between coil portions in a delta connection winding pattern such that each coil portion corresponds to one of three phases of the dynamoelectric machine.

4. The method of claim 1, wherein each connection portion includes a lead portion, the method further comprising cutting at least one lead portion to define two wire ends.

5. The method of claim 4, further comprising:
bundling the two wire ends together with other lead portions of the same phase as the two wire ends.

6. The method of claim 1, wherein winding includes winding the wire using a winding machine to automatically wind the wire around the plurality of teeth and route the connection portion(s).

7. The method of claim 1, wherein winding includes winding the wire around all the teeth using only one winding needle.

8. The method of claim 1, further comprising:
assembling the stator assembly into a compressor after winding the wire around the plurality of teeth.

9. A stator assembly formed by the method of claim 1.

10. The method of claim 1, wherein:
the end cap is a second end cap, and the stator assembly includes a first end cap positioned at the second end of the stator core;
the plurality of teeth include a first tooth, a second tooth, a third tooth, a fourth tooth, a fifth tooth, a sixth tooth, a seventh tooth, an eighth tooth, and a ninth tooth;
the first tooth is positioned between the ninth tooth and the second tooth, the second tooth is positioned between the first tooth and the third tooth, the third tooth is positioned between the second tooth and the fourth tooth, the fourth tooth is positioned between the third tooth and the fifth tooth, the fifth tooth is positioned between the fourth tooth and the sixth tooth, the sixth tooth is positioned between the fifth tooth and the seventh tooth, the seventh tooth is positioned between the sixth tooth and the eighth tooth, the eighth tooth is positioned between the seventh tooth and the ninth tooth, and the ninth tooth is positioned between the eighth tooth and the first tooth;
winding the wire about a first one of the plurality of teeth includes routing the wire from the first end of the stator assembly to the second end of the stator assembly through a slot between the second tooth and the third tooth to form a lead portion belonging to a first lead bundle, routing the wire along the second end cap to the eighth tooth, and winding the wire about the eighth tooth to form the first coil portion about the eighth tooth;
routing the wire from the first one of the plurality of teeth to the second one of the plurality of teeth includes routing the wire along the second end cap from the eighth tooth to a slot between the first tooth and the second tooth, routing the wire through the slot between the first tooth and the second tooth twice to form another lead portion belonging to a second lead bundle, and routing the wire along the second end cap to the seventh tooth, to form the connection portion between the eighth tooth and the seventh tooth; and winding the wire about the second one of the plurality of teeth includes winding the wire about the seventh tooth to form the second coil portion about the seventh tooth;
the method further comprising routing the wire along the second end cap from the seventh tooth to a slot between the ninth tooth and the first tooth, routing the wire through the slot between the ninth tooth and the first tooth twice to form another lead portion belonging to a third lead bundle, routing the wire along the second end cap to the sixth tooth, winding the wire about the sixth tooth, routing the wire along the second end cap from the sixth tooth to the slot between the second tooth and the third tooth, routing the wire through the slot between the second tooth and the third tooth twice to form another lead portion belonging to the first lead bundle, routing the wire along the second end cap to the fifth tooth, winding the wire about the fifth tooth, routing the wire along the second end cap from the fifth tooth to the slot between the first tooth and the second tooth, routing the wire through the slot between the first tooth and the second tooth twice to form another lead potion belonging to the second lead bundle, routing the wire along the second end cap to the fourth tooth, winding the wire about the fourth tooth, routing the wire along the second end cap from the fourth tooth to the slot between the ninth tooth and the first tooth, routing the wire through the slot between the ninth tooth and the first tooth twice to form another lead portion belonging to the third lead bundle, routing the wire along the second end cap to the third tooth, winding the wire about the third tooth, routing the wire along the outside of the first end cap from the third tooth to the second tooth to form another lead portion belonging to the first lead bundle, winding the wire about the second tooth, routing the wire along the outside of the first end cap from the second tooth to the first tooth to form another lead portion belonging to the second lead bundle, winding the wire about the first tooth, routing the wire outside of the first end cap from the first tooth to the ninth tooth to form another lead portion belonging to the third lead bundle, winding the wire about the ninth tooth, and routing the wire along the first end cap from the ninth tooth to the slot between the second tooth and the third tooth to form another lead portion belonging to the first lead bundle.

11. The method of claim 1, wherein:
the end cap is a second end cap, and the stator assembly includes a first end cap positioned at the second end of the stator core;
the plurality of teeth include a first tooth, a second tooth, a third tooth, a fourth tooth, a fifth tooth, a sixth tooth, a seventh tooth, an eighth tooth, and a ninth tooth;
the first tooth is positioned between the ninth tooth and the second tooth, the second tooth is positioned between the first tooth and the third tooth, the third tooth is positioned between the second tooth and the fourth tooth, the fourth tooth is positioned between the third tooth and the fifth tooth, the fifth tooth is positioned between the fourth tooth and the sixth tooth, the sixth tooth is positioned between the fifth tooth and the seventh tooth, the seventh tooth is positioned between the sixth tooth and the eighth tooth, the eighth tooth is positioned between the seventh tooth and the ninth tooth, and the ninth tooth is positioned between the eighth tooth and the first tooth;

winding the wire about a first one of the plurality of teeth includes routing the wire from the first end of the stator assembly to the second end of the stator assembly through a slot between the third tooth and the fourth tooth to form a lead portion belonging to a first lead bundle, routing the wire along the second end cap to the ninth tooth, and winding the wire about the ninth tooth to form the first coil portion about the ninth tooth;

routing the wire from the first one of the plurality of teeth to the second one of the plurality of teeth includes routing the wire along the second end cap from the ninth tooth to a slot between the second tooth and the third tooth, routing the wire through the slot between the second tooth and the third tooth twice to form another lead portion belonging to a second lead bundle, and routing the wire along the second end cap to the eight tooth, to form the connection portion between the ninth tooth and the eighth tooth; and winding the wire about the second one of the plurality of teeth includes winding the wire about the eighth tooth to form the second coil portion about the eighth tooth;

the method further comprising routing the wire along the second end cap from the eighth tooth to a slot between the first tooth and the second tooth, routing the wire through the slot between the first tooth and the second tooth twice to form another lead portion belonging to a third lead bundle, routing the wire along the second end cap to the seventh tooth, winding the wire about the seventh tooth, routing the wire along the second end cap from the seventh tooth to the slot between the third tooth and the fourth tooth, routing the wire through the slot between the third tooth and the fourth tooth twice to form another lead portion belonging to the first lead bundle, routing the wire along the second end cap to the sixth tooth, winding the wire about the sixth tooth, routing the wire along the second end cap from the sixth tooth to the slot between the second tooth and the third tooth, routing the wire through the slot between the second tooth and the third tooth twice to form another lead potion belonging to the second lead bundle, routing the wire along the second end cap to the fifth tooth, winding the wire about the fifth tooth, routing the wire along the second end cap from the fifth tooth to the slot between the first tooth and the second tooth, routing the wire through the slot between the first tooth and the second tooth twice to form another lead portion belonging to the third lead bundle, routing the wire along the second end cap to the fourth tooth, winding the wire about the fourth tooth, routing the wire along the second end cap from the fourth tooth to a slot between the third tooth and the fourth tooth, routing the wire through the slot between the third tooth and the fourth tooth once to form another lead portion belonging to the first lead bundle, winding the wire about the third tooth, routing the wire along the second end cap from the third tooth to the second tooth, routing the wire trough the slot between the second tooth and the third tooth once to form another lead portion belonging to the second lead bundle, winding the wire about the second tooth, routing the wire along the second end cap from the second tooth to the slot between the first tooth and the second tooth, routing the wire through the slot between the first tooth and the second tooth once to form another lead portion belonging to the third lead bundle, winding the wire about the first tooth, and routing the wire along the first end cap from the first tooth to the slot between the third tooth and the fourth tooth to form another lead portion belonging to the first lead bundle.

12. The method of claim 1, wherein:

the end cap is a second end cap, and the stator assembly includes a first end cap positioned at the second end of the stator core;

the plurality of teeth include a first tooth, a second tooth, a third tooth, a fourth tooth, a fifth tooth, a sixth tooth, a seventh tooth, an eighth tooth, and a ninth tooth;

the first tooth is positioned between the ninth tooth and the second tooth, the second tooth is positioned between the first tooth and the third tooth, the third tooth is positioned between the second tooth and the fourth tooth, the fourth tooth is positioned between the third tooth and the fifth tooth, the fifth tooth is positioned between the fourth tooth and the sixth tooth, the sixth tooth is positioned between the fifth tooth and the seventh tooth, the seventh tooth is positioned between the sixth tooth and the eighth tooth, the eighth tooth is positioned between the seventh tooth and the ninth tooth, and the ninth tooth is positioned between the eighth tooth and the first tooth;

winding the wire about a first one of the plurality of teeth includes routing the wire from the first end of the stator assembly to the second end of the stator assembly through a slot between the second tooth and the third tooth to form a lead portion belonging to a first lead bundle, routing the wire along the second end cap to the eighth tooth, and winding the wire about the eighth tooth to form the first coil portion about the eighth tooth;

routing the wire from the first one of the plurality of teeth to the second one of the plurality of teeth includes routing the wire along the second end cap from the eighth tooth to a slot between the first tooth and the second tooth, routing the wire through the slot between the first tooth and the second tooth twice to form another lead portion belonging to a second lead bundle, and routing the wire along the second end cap to the seventh tooth, to form the connection portion between the eighth tooth and the seventh tooth; and winding the wire about the second one of the plurality of teeth includes winding the wire about the seventh tooth to form the second coil portion about the seventh tooth;

the method further comprising routing the wire along the second end cap from the seventh tooth to a slot between the ninth tooth and the first tooth, routing the wire through the slot between the ninth tooth and the first tooth twice to form another lead portion belonging to a third lead bundle, routing the wire along the second end cap to the sixth tooth, winding the wire about the sixth tooth, routing the wire along the second end cap from the sixth tooth to the slot between the second tooth and the third tooth, routing the wire through the slot between the second tooth and the third tooth twice to form another lead portion belonging to the first lead bundle, routing the wire along the second end cap to the fifth tooth, winding the wire about the fifth tooth, routing the wire along the second end cap from the fifth tooth to the slot between the first tooth and the second tooth, routing the wire through the slot between the first tooth and the second tooth twice to form another lead potion belonging to the second lead bundle, routing the wire along the second end cap to the fourth tooth, winding the wire about the fourth tooth, routing the wire along the second end cap from the fourth tooth to the slot between the ninth tooth and the first tooth, routing the wire through the slot between the ninth tooth and the first tooth twice to form another lead portion belonging to the third lead bundle, routing the wire along the second end cap to the third tooth, winding the wire about the third tooth, routing the wire along the inside of the first end cap from the third tooth to the second tooth to form another lead portion belonging to the first lead bundle, winding the wire about the second tooth, routing the wire along the inside of the first end cap from the second tooth to the first tooth to form another lead portion belonging to the second lead bundle, winding the wire about the first tooth, routing the wire inside of the first end cap from the first tooth to the ninth tooth to form another lead portion belonging to the third lead bundle, winding the wire about the ninth tooth, and routing the wire along the first end cap from the ninth tooth to the slot between the second tooth and the third tooth to form another lead portion belonging to the first lead bundle.

13. The method of claim 1, wherein:
the end cap is a second end cap, and the stator assembly includes a first end cap positioned at the second end of the stator core;
the plurality of teeth include a first tooth, a second tooth, a third tooth, a fourth tooth, a fifth tooth, a sixth tooth, a seventh tooth, an eighth tooth, and a ninth tooth;
the first tooth is positioned between the ninth tooth and the second tooth, the second tooth is positioned between the first tooth and the third tooth, the third tooth is positioned between the second tooth and the fourth tooth, the fourth tooth is positioned between the third tooth and the fifth tooth, the fifth tooth is positioned between the fourth tooth and the sixth tooth, the sixth tooth is positioned between the fifth tooth and the seventh tooth, the seventh tooth is positioned between the sixth tooth and the eighth tooth, the eighth tooth is positioned between the seventh tooth and the ninth tooth, and the ninth tooth is positioned between the eighth tooth and the first tooth;
winding the wire about a first one of the plurality of teeth includes routing the wire from the first end of the stator assembly to the second end of the stator assembly through a slot between the third tooth and the fourth tooth to form a lead portion, routing the wire along the second end cap to the ninth tooth, and winding the wire about the ninth tooth to form the first coil portion about the ninth tooth;
routing the wire from the first one of the plurality of teeth to the second one of the plurality of teeth includes routing the wire along the second end cap from the ninth tooth to a slot between the second tooth and the third tooth, routing the wire through the slot between the second tooth and the third tooth twice to form another lead portion, and routing the wire along the second end cap to the eighth tooth, to form the connection portion between the ninth tooth and the eighth tooth; and
winding the wire about the second one of the plurality of teeth includes winding the wire about the eighth tooth to form the second coil portion about the eighth tooth;

the method further comprising routing the wire along the second end cap from the eighth tooth to a slot between the first tooth and the second tooth, routing the wire through the slot between the first tooth and the second tooth twice to form another lead portion, routing the wire along the second end cap to the seventh tooth, winding the wire about the seventh tooth, routing the wire along the second end cap from the seventh tooth to the slot between the sixth tooth and the seventh tooth, routing the wire through the slot between the sixth tooth and the seventh tooth once to form another lead portion, winding the wire about the sixth tooth, routing the wire along the second end cap from the sixth tooth to the slot between the fifth tooth and the sixth tooth, routing the wire through the slot between the fifth tooth and the sixth tooth once to form another lead potion, winding the wire about the fifth tooth, routing the wire along the second end cap from the fifth tooth to the slot between the fourth tooth and the fifth tooth, routing the wire through the slot between the fourth tooth and the fifth tooth once to form another lead portion, winding the wire about the fourth tooth, routing the wire along the second end cap from the fourth tooth to the slot between the third tooth and the fourth tooth, routing the wire through the slot between the third tooth and the fourth tooth to form another lead portion, winding the wire about the third tooth, routing the wire along the second end cap from the third tooth to slot between the second tooth and the third tooth, routing the wire through the slot between the second tooth and the third tooth once to form another lead portion, winding the wire about the second tooth, routing the wire along the second end cap from the second tooth to the slot between the first tooth and the second tooth, routing the wire through the slot between the first and second tooth once to form another lead portion, winding the wire about the first tooth, and routing the wire along the first end cap from the first tooth to the slot between the third tooth and the forth tooth to form another lead portion.

14. A method of winding a stator assembly for a three phase dynamoelectric machine, the stator assembly including a non-segmented stator core including a stator yoke, a plurality of teeth extending from the stator yoke toward a central opening, a first end cap, a second end cap and a plurality of coil portions electrically coupled in a delta winding pattern, the plurality of coil portions including a first coil portion and a second coil portion, the central opening extending from a first end of the stator core to a second end of the stator core opposite the first end, the plurality of teeth spaced apart from one another and defining a plurality of slots between the plurality of teeth for receiving windings of the stator assembly, the first end cap positioned at a first one of the ends of the stator assembly and a second end cap positioned at a second one of the ends of the stator assembly, the plurality of teeth including a first tooth, a second tooth, a third tooth, a fourth tooth, a fifth tooth, a sixth tooth, a seventh tooth, an eighth tooth, and a ninth tooth, the first tooth positioned between the ninth tooth and the second tooth, the second tooth positioned between the first tooth and the third tooth, the third tooth positioned between the second tooth and the fourth tooth, the fourth tooth positioned between the third tooth and the fifth tooth, the fifth tooth positioned between the fourth tooth and the sixth tooth, the sixth tooth positioned between the fifth tooth and the seventh tooth, the seventh tooth positioned between the sixth tooth and the eighth tooth, the eighth tooth positioned between the seventh tooth and the ninth tooth, and the ninth tooth positioned between the eighth tooth and the first tooth, the method comprising:

routing the wire from the first end of the stator assembly to the second end of the stator assembly through a slot between the second tooth and the third tooth to form a lead portion belonging to a first lead bundle, routing the wire along the second end cap to the eighth tooth, and winding the wire about the eighth tooth to form a coil portion about the eighth tooth, routing the wire along the second end cap from the eighth tooth to a slot between the first tooth and the second tooth, routing the wire through the slot between the first tooth and the second tooth twice to form another lead portion belonging to a second lead bundle, and routing the wire along the second end cap to the seventh tooth, to form a connection portion between the eighth tooth and the seventh tooth, winding the wire about the seventh tooth to form a coil portion about the seventh tooth, routing the wire along the second end cap from the seventh tooth to a slot between the ninth tooth and the first tooth, routing the wire through the slot between the ninth tooth and the first tooth twice to form another lead portion belonging to a third lead bundle, routing the wire along the second end cap to the sixth tooth, winding the wire about the sixth tooth, routing the wire along the second end cap from the sixth tooth to the slot between the second tooth and the third tooth, routing the wire through the slot between the second tooth and the third tooth twice to form another lead portion belonging to the first lead bundle, routing the wire along the second end cap to the fifth tooth, winding the wire about the fifth tooth, routing the wire along the second end cap from the fifth tooth to the slot between the first tooth and the second tooth, routing the wire through the slot between the first tooth and the second tooth twice to form another lead potion belonging to the second lead bundle, routing the wire along the second end cap to the fourth tooth, winding the wire about the fourth tooth, routing the wire along the second end cap from the fourth tooth to the slot between the ninth tooth and the first tooth, routing the wire through the slot between the ninth tooth and the first tooth twice to form another lead portion belonging to the third lead bundle, routing the wire along the second end cap to the third tooth, winding the wire about the third tooth, routing the wire along the outside of the first end cap from the third tooth to the second tooth to form another lead portion belonging to the first lead bundle, winding the wire about the second tooth, routing the wire along the outside of the first end cap from the second tooth to the first tooth to form another lead portion belonging to the second lead bundle, winding the wire about the first tooth, routing the wire outside of the first end cap from the first tooth to the ninth tooth to form another lead portion belonging to the third lead bundle, winding the wire about the ninth tooth, and routing the wire along the first end cap from the ninth tooth to the slot between the second tooth and the third tooth to form another lead portion belonging to the first lead bundle, where all coil portions and connection portions are defined by a continuous length of wire.

15. A method of winding a stator assembly for a three phase dynamoelectric machine, the stator assembly including a non-segmented stator core including a stator yoke, a plurality of teeth extending from the stator yoke toward a central opening, a first end cap, a second end cap and a plurality of coil portions electrically coupled in a delta winding pattern, the plurality of coil portions including a first coil portion and a second coil portion, the central opening extending from a first end of the stator core to a second end of the stator core opposite the first end, the plurality of teeth spaced apart from one another and defining a plurality of slots between the plurality of teeth for receiving windings of the stator assembly, the first end cap positioned at a first one of the ends of the stator assembly and a second end cap positioned at a second one of the ends of the stator assembly, the plurality of teeth including a first tooth, a second tooth, a third tooth, a fourth tooth, a fifth tooth, a sixth tooth, a seventh tooth, an eighth tooth, and a ninth tooth, the first tooth positioned between the ninth tooth and the second tooth, the second tooth positioned between the first tooth and the third tooth, the third tooth positioned between the second tooth and the fourth tooth, the fourth tooth positioned between the third tooth and the fifth tooth, the fifth tooth positioned between the fourth tooth and the sixth tooth, the sixth tooth positioned between the fifth tooth and the seventh tooth, the seventh tooth positioned between the sixth tooth and the eighth tooth, the eighth tooth positioned between the seventh tooth and the ninth tooth, and the ninth tooth positioned between the eighth tooth and the first tooth, the method comprising:

routing the wire from the first end of the stator assembly to the second end of the stator assembly through a slot between the third tooth and the fourth tooth to form a lead portion belonging to a first lead bundle, routing the wire along the second end cap to the ninth tooth, and winding the wire about the ninth tooth to form a coil portion about the ninth tooth, routing the wire along the second end cap from the ninth tooth to a slot between the second tooth and the third tooth, routing the wire through the slot between the second tooth and the third tooth twice to form another lead portion belonging to a second lead bundle, and routing the wire along the second end cap to the eight tooth, to form a connection portion between the ninth tooth and the eighth tooth, winding the wire about the eighth tooth to form a coil portion about the eighth tooth, routing the wire along the second end cap from the eighth tooth to a slot between the first tooth and the second tooth, routing the wire through the slot between the first tooth and the second tooth twice to form another lead portion belonging to a third lead bundle, routing the wire along the second end cap to the seventh tooth, winding the wire about the seventh tooth, routing the wire along the second end cap from the seventh tooth to the slot between the third tooth and the fourth tooth, routing the wire through the slot between the third tooth and the fourth tooth twice to form another lead portion belonging to the first lead bundle, routing the wire along the second end cap to the sixth tooth, winding the wire about the sixth tooth, routing the wire along the second end cap from the sixth tooth to the slot between the second tooth and the third tooth, routing the wire through the slot between the second tooth and the third tooth twice to form another lead potion belonging to the second lead bundle, routing the wire along the second end cap to the fifth tooth, winding the wire about the fifth tooth, routing the wire along the second end cap from the fifth tooth to the slot between the first tooth and the second tooth, routing the wire through the slot between the first tooth and the second tooth twice to form another lead portion belonging to the third lead bundle, routing the wire along the second end cap to the fourth tooth, winding the wire about the fourth tooth, routing the wire along the second end cap from the fourth tooth to a slot between the third tooth and the fourth tooth, routing the wire through the slot between the third tooth and the fourth tooth once to form another lead portion belonging to the first lead bundle, winding the wire about the third tooth, routing the wire along the second end cap from the third tooth to the second tooth, routing the wire trough the slot between the second tooth and the third tooth once to form another lead portion belonging to the second lead bundle, winding the wire about the second tooth, routing the wire along the second end cap from the second tooth to the slot between the first tooth and the second tooth, routing the wire through the slot between the first tooth and the second tooth once to form another lead portion belonging to the third lead bundle, winding the wire about the first tooth, and routing the wire along the first end cap from the first tooth to the slot between the third tooth and the fourth tooth to form another lead portion belonging to the first lead bundle, where all coil portion and connection portions are defined by a continuous length of wire.

* * * * *